(12) United States Patent
Biagini et al.

(10) Patent No.: US 11,364,809 B2
(45) Date of Patent: Jun. 21, 2022

(54) METHOD OF CHARGING FROM ELECTRIC VEHICLE TO ELECTRIC VEHICLE

(71) Applicant: INTELLIGENT ELECTRONIC SYSTEMS, Saint-Aunes (FR)

(72) Inventors: Eric Biagini, Perols (FR); François Coste, Montpellier (FR); Guillaume Jean, Grau d'Agde (FR)

(73) Assignee: INTELLIGENT ELECTRONIC SYSTEMS, Saint-Aunes (FR)

( * ) Notice: Subject to any disclaimer, the term of this patent is extended or adjusted under 35 U.S.C. 154(b) by 0 days.

(21) Appl. No.: 15/035,208

(22) PCT Filed: Nov. 6, 2014

(86) PCT No.: PCT/EP2014/073929
§ 371 (c)(1),
(2) Date: May 6, 2016

(87) PCT Pub. No.: WO2015/067694
PCT Pub. Date: May 14, 2015

(65) Prior Publication Data
US 2016/0288664 A1    Oct. 6, 2016

(30) Foreign Application Priority Data

Nov. 8, 2013 (FR) ...................................... 1360940

(51) Int. Cl.
*B60L 53/14* (2019.01)
*H02M 3/335* (2006.01)
(Continued)

(52) U.S. Cl.
CPC .............. *B60L 53/14* (2019.02); *B60L 53/20* (2019.02); *B60L 53/63* (2019.02); *B60L 53/80* (2019.02);
(Continued)

(58) Field of Classification Search
CPC .............. B60L 11/1811; B60L 11/1812; B60L 11/1816; B60L 11/1818; B60L 11/1822;
(Continued)

(56) References Cited

U.S. PATENT DOCUMENTS 4,617,506 A    10/1986 Bogie et al.
5,283,513 A    2/1994 Fujita et al.
(Continued)

FOREIGN PATENT DOCUMENTS

CN    2569355 Y    8/2003
CN    101783524 A    7/2010
(Continued)

OTHER PUBLICATIONS

PCT/EP2014/073929—International Search Report and Written Opiniondated May 1, 2015, 10 pages.
(Continued)

*Primary Examiner* — Richard Isla
*Assistant Examiner* — Michael N DiBenedetto
(74) *Attorney, Agent, or Firm* — Haynes Beffel & Wolfeld LLP; Andrew Dunlap

(57) ABSTRACT

The invention first relates to a charging device (1) adapted for being connected on the one hand to a battery of a first electric vehicle (14), and on the other hand to a battery of a second electric vehicle (12), for being supplied with direct input current by the battery of the first electric vehicle (14), and for supplying the battery of the second electric vehicle (12) with a direct output current.

The invention also relates to a charging method using this charging device.

19 Claims, 2 Drawing Sheets

(51) Int. Cl.
| | |
|---|---|
| *B60L 53/63* | (2019.01) |
| *B60L 53/20* | (2019.01) |
| *B60L 53/80* | (2019.01) |
| *H02J 7/34* | (2006.01) |
| *H02J 7/00* | (2006.01) |

(52) U.S. Cl.
CPC ............ *H02J 7/0027* (2013.01); *H02J 7/342* (2020.01); *H02M 3/33584* (2013.01); *Y02T 10/70* (2013.01); *Y02T 10/7072* (2013.01); *Y02T 90/12* (2013.01); *Y02T 90/14* (2013.01)

(58) Field of Classification Search
CPC ........... B60L 11/1844; H02J 2007/0095; H02J 7/0021; H02J 7/0026; H02J 7/0027
USPC .......................................... 320/103, 104, 105
See application file for complete search history.

(56) References Cited

U.S. PATENT DOCUMENTS

| | | | |
|---|---|---|---|
| 8,013,567 B2 | 9/2011 | Windsor | |
| 8,120,310 B2 | 2/2012 | Littrell et al. | |
| 2008/0297103 A1 | 12/2008 | Windsor | |
| 2009/0161394 A1* | 6/2009 | Hung | ........................ G06F 1/26 363/65 |
| 2011/0055037 A1* | 3/2011 | Hayashigawa | ....... B60L 3/0069 705/26.1 |
| 2011/0169447 A1 | 7/2011 | Brown et al. | |
| 2012/0025759 A1 | 2/2012 | Kressner | |
| 2012/0081073 A1 | 4/2012 | Niemann et al. | |
| 2013/0049690 A1 | 2/2013 | Lin | |
| 2014/0191705 A1* | 7/2014 | Takao | .................. H02J 7/0054 320/103 |
| 2014/0210449 A1* | 7/2014 | Ichikawa | ............ H02J 7/00047 324/76.11 |
| 2016/0272075 A1 | 9/2016 | Biagini et al. | |

FOREIGN PATENT DOCUMENTS

| | | |
|---|---|---|
| CN | 101882807 A | 11/2010 |
| CN | 103187759 A | 7/2013 |
| DE | 102012205972 A1 | 10/2013 |
| EP | 2612786 A2 | 7/2013 |
| EP | 2631105 A1 | 8/2013 |
| EP | 2660950 A2 | 11/2013 |
| EP | 2690749 A1 | 1/2014 |
| FR | 2978303 A1 * | 1/2013 ............ H01M 10/44 |
| JP | 2007267561 A | 10/2007 |
| JP | 2010252520 A | 11/2010 |

OTHER PUBLICATIONS

PCT/EP2014/073930—International Search Report and Written Opinion dated May 13, 2014, 13 pages.
CN 201480061103.7—Office Action dated Feb. 5, 2018, 10 pages.
CN 201480060401.7—Office Action dated Mar. 12, 2018, 17 pages.
CN 201480061103.7—2nd Office Action dated Nov. 21, 2018, 8 pages.
CN 201480061103.7—3rd Office Action dated Apr. 18, 2019, 13 pages.
EP 14798756.4—Reply to PCT/ISA Written Opinion filed Dec. 20, 2016 with Google Machine English Translation, 10 pages.
EP 14798756.4—71(3) EP Communication re Intent to Grant in French dated Aug. 7, 2018, 10 pages.
PCT/EP2014/073929—International Preliminary Report on Patentability dated May 10, 2016, 7 pages.
PCT/EP2014/073930—International Preliminary Report on Patentability dated May 10, 2016, 9 pages.

* cited by examiner

METHOD OF CHARGING FROM ELECTRIC VEHICLE TO ELECTRIC VEHICLE

FIELD OF THE INVENTION

The present invention relates to a method of charging from electric vehicle to electric vehicle, as well as a charging device making it possible to implement this method.

TECHNICAL FIELD

Many vehicles use electricity and are equipped with batteries, for example electric motor vehicles, as well as lifts, pallet trucks, etc.

The batteries of these vehicles are powered using direct current. To that end, it is known to use charging devices making it possible to convert the alternating current from the electricity distribution grid into appropriate direct current for charging the battery.

Two types of charging devices are known: on the one hand, onboard chargers, which are mounted directly on the electric vehicles; and on the other hand, external chargers, integrated into fixed charging terminals (for example in a workshop, parking lot, garage, or on the road). Furthermore, there are external chargers mounted on moving carriages, which are generally bulky and have a heavy weight.

However, electric vehicles have risks of immobilization, for example due to the limited autonomy of batteries or in case of a failure of the onboard or external charger. Furthermore, electric vehicles may not be equipped with an onboard charger, in particular in the case of a use where battery charging may systematically be done with a fixed external charger in a recharging station, for example.

There is therefore a need to improve the usage safety of electric vehicles, and in particular to avoid the risks of immobilization by excessive depletion of the batteries.

SUMMARY OF THE INVENTION

The invention first relates to a charging device adapted for being connected on the one hand to a battery of a first electric vehicle, and on the other hand to a battery of a second electric vehicle, for being supplied with direct input current by the battery of the first electric vehicle, and for supplying the battery of the second electric vehicle with a direct output current.

According to one embodiment, the input current and the output current are different, the charging device being adapted for converting the input current into output current.

According to one embodiment, the charging device is integrated into the first electric vehicle, or is integrated into the second electric vehicle.

According to one embodiment, the charging device is a removable and portable charging device.

According to one embodiment, the charging device is also adapted for being connected on the one hand to an alternating current source and on the other hand to a battery of an electric vehicle, for being supplied with an input current from the alternating current source, for converting the input current into a direct output current, and for supplying the battery of the electric vehicle with said direct output current.

According to one embodiment, the charging device comprises a first stage converting the input current into a direct intermediate current as well as a second stage converting the intermediate current into an output current.

According to one embodiment, the charging device includes a control system adapted for adjusting the parameters of the power supply of the battery of the second vehicle, preferably adjusting the parameters of the conversion of the input current and output current; and adapted for exchanging information and instructions with the first vehicle and/or with the second vehicle and/or if applicable with the alternating current source.

According to one embodiment, the control system is provided with auxiliary power supply means, preferably chosen from among an auxiliary battery and an auxiliary converter adapted for receiving a direct or alternating external current and converting it into a direct supply current of the control system.

According to one embodiment, the electric vehicle is an electric automobile.

The invention also relates to a method for charging an electric vehicle battery, comprising:
  connecting a charging device to a battery of a first vehicle and/or to a battery of a second vehicle;
  supplying the charging device by a direct input current from the battery of the first vehicle;
  supplying the battery of the second vehicle with an output current from the charging device.

According to one embodiment, the method comprises:
  converting the input current into a direct output current with the charging device.

According to one embodiment, the charging device is integrated into the first vehicle, and the connection step consists of connecting the charging device to the second vehicle, preferably by means of a power cable; or the charging device is integrated into the second vehicle, and the connection step consists of connecting the charging device to the first vehicle, preferably using a power cable.

According to one embodiment, the charging device is a removable device, and the connection step consists of connecting the charging device to the first vehicle and the second vehicle.

According to one embodiment, the output current has a voltage of 200 to 550 V; and/or the output current has a power less than or equal to 20 kW, preferably less than or equal to 10 kW or 6 kW.

According to one embodiment, the method comprises adjusting parameters for the supply of power to the battery of the second vehicle and exchanging information and instructions between the charging device and the first vehicle and/or the second vehicle; the method preferably comprising sending an instruction from the charging device to the first vehicle to trigger the supply of power to the charging device from the battery of the first vehicle.

According to one embodiment, the method comprises a preliminary step for supplying power to the charging device via an auxiliary power supply source, preferably chosen from among an auxiliary battery and a direct or alternating external current.

According to one embodiment, the electric vehicle is an electric automobile.

The present invention makes it possible to overcome the drawbacks of the state of the art. It more particularly makes it possible to improve the usage safety of electric vehicles, and in particular to avoid risks of immobilization of the vehicles.

This is accomplished owing to the development of a charging device making it possible to charge an electric vehicle battery from the battery of another electric vehicle, this device thus forming a veritable backup charger making it possible to recharge an electric vehicle battery in case of failure.

DESCRIPTION OF EMBODIMENTS OF THE INVENTION

The invention will now be described in more detail and in a non-limiting manner in the following description.

The invention proposes a charging device adapted for powering an electric vehicle battery. An electric vehicle refers to a motorized device capable of moving or transporting people or equipment, the motor of which is supplied with electricity by a motor battery.

The electric vehicle is preferably an electric automobile. Alternatively, it may for example be a handling vehicle such as a power lift truck, an aerial lift, or a pallet truck.

According to one embodiment, it is a removable and portable loading device. "Portable" or "transportable" means that the device can be lifted and moved by one healthy adult, without the assistance of any specialized equipment. The device is not permanently integrated on a fixed structure such as an electric vehicle charging terminal. The device is also not permanently integrated in the electric vehicle, i.e., it is not an onboard charger.

As an illustration, the device may have a mass less than or equal to 20 kg, preferably less than or equal to 15 kg, or 10 kg, or 7.5 kg, or 5 kg.

As an illustration, the device may have a maximum dimension smaller than or equal to 60 cm, preferably smaller than or equal to 50 cm, or 40 cm, or 30 cm.

The device can be integrated into a casing, if applicable provided with appropriate power cables.

Alternatively, the device can be on board, i.e., integrated in a fixed manner in an electric vehicle (either the vehicle providing the current, or the vehicle recovering the current, or a vehicle that may be both providing current and receiving current depending on the operating mode of the device). It may in particular be connected permanently to the battery of the vehicle in which it is integrated.

Figure 1:
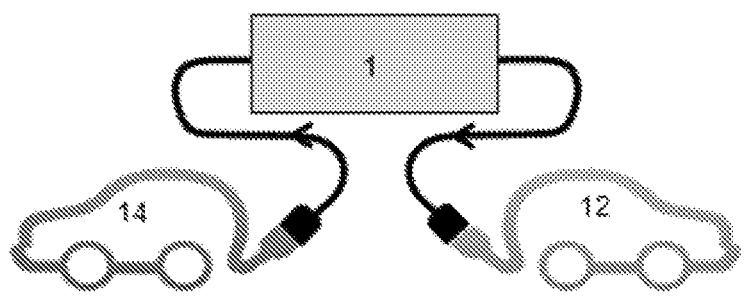
FIG. 1 is a diagram showing the operation of a charging device according to the invention, in a first operating mode.

According to a first operating mode, illustrated in FIG. 1, the charging device 1 is connected to a battery of a first electric vehicle 14 and to a battery of a second electric vehicle 12, if applicable via appropriate cables.

The battery of the first electric vehicle 14 constitutes a current source: it supplies the charging device 1 with an input current, which in this embodiment is direct. Additionally, the charging device 1 supplies the battery of the second electric vehicle 12 with an output current, which is also direct.

According to one embodiment, the charging device 1 does not perform any conversion, for example in the event at least one of the vehicles is provided with a reversible charging device capable of providing a controlled current transfer from the battery of one vehicle toward the battery of the other vehicle. In such a case, the charging device 1 can be limited to a simple connecting and protocol management device between the two electric vehicles: it may then simply be integrated into a connecting cable between the electric vehicles.

Alternatively, and preferably, the input current is different from the output current, and the charging device 1 therefore performs a DC-DC conversion.

Given that the voltage at which an electric vehicle battery charges (or depletes) varies depending on its charge level, such an embodiment is particularly advantageous.

Thus, the charging device 1 can, depending on the case, act as a step-up or step-down transformer.

According to one embodiment, the charging device 1 comprises galvanic insulation between the input and the output.

According to one alternative embodiment, the charging device 1 has no galvanic insulation between the input and the output.

In this embodiment, the delivered input current can for example have a voltage from 20 to 1500 V, preferably from 50 to 550 V, more particularly preferably from 200 to 550 V, and especially particularly from 300 to 500 V.

Figure 2:
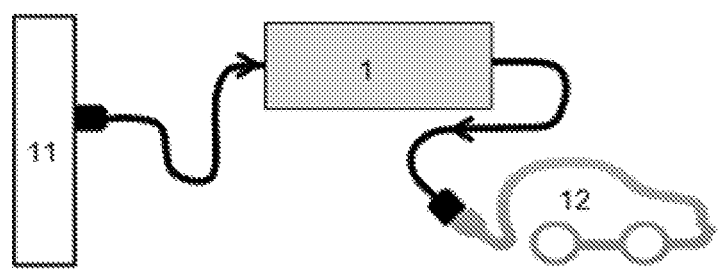
FIG. 2 is a diagram showing the operation of a charging device according to the invention, in a second operating mode.

In a second operating mode, illustrated in FIG. 2, the charging device 1 is connected on the one hand to an alternating current source 11 and on the other hand, at its output, to an electric vehicle battery 12, if applicable using appropriate cables.

The alternating current source 11 can for example be the general electricity distribution grid. It supplies the charging device 1 with alternating input current, preferably a monophasic current (alternatively, optionally, a multiphase current, in particular tri-phase). If the input current is a monophasic current, it may for example have a voltage from 85 to 265 V (for example, 110 or 230 V).

In a third operating mode, the charging device 1 is connected on the one hand to a direct current source (which can for example be a fixed external battery, or an external battery on a moving carriage, or an external battery onboard an emergency vehicle), and on the other hand, at the output, to an electric vehicle battery, using appropriate cables if applicable.

The delivered input current, in this third operating mode, can for example have a voltage from 20 to 1500 V, preferably from 50 to 550 V, still more particularly preferably from 200 to 550 V, and especially particularly from 300 to 500 V.

According to one embodiment, the charging device is adapted for operating according to the first operating mode only.

According to one embodiment, the charging device is adapted for operating according to both the first operating mode and the second operating mode.

According to one embodiment, the charging device is adapted for operating according to both the first operating mode and the third operating mode.

According to one embodiment, the charging device is adapted for operating according to all of the first operating mode, the second operating mode and the third operating mode.

In each operating mode, the output current delivered is a direct current appropriate for charging electric vehicle battery, i.e., having a voltage from 20 to 1500 V, preferably from 50 to 550 V, still more particularly preferably from 200 550 V, and especially particularly from 300 to 500 V.

In the second operating mode, the charging device 1 performs an AC-DC conversion.

According to one embodiment, the charging device 1 performs a conversion of the input current into an intermediate (direct) current, then the conversion of the intermediate current into an output current. Preferably, the conversion of the intermediate current into an output current is done using a transformer provided on either side with cutting conversion modules.

Preferably, the charging device 1 comprises means for exchanging information and instructions with the current source (or with the different possible current sources) and with the electric vehicle needing to be charged (for example, with the battery thereof); as well as means for adjusting parameters of the conversion of the input current and output current, in particular based on information received from the current source and/or information received from the battery of the electric vehicle to be charged and/or instructions given by the user. All of these means make it possible to provide complete management of the charging protocol.

The interface of the charging device 110 must be compatible with standard EN61851, in modes 1 and/or 2 and/or 3, and/or compatible with the Chademo standard and/or with standard ISO 15118 and/or compatible with standard J1772 and/or any other standard defining a protocol and a system for communication between the charging device, the current source and the vehicle.

According to one embodiment, the charging device 1 operates according to one or another standard depending on the vehicle to be charged and the current source.

The means for exchanging information and instructions with the current source can in particular be able to trigger the supply of input current by the current source (in particular by the battery of the first vehicle, regarding the first operating mode), as part of a secure operation.

The means for exchanging information and instructions with the current source can also be capable of avoiding excessive depletion thereof, when it involves a vehicle battery (first operating mode), or even an external battery (third operating mode).

According to one embodiment, the charging device 1 is reversible, i.e., it is capable of retrieving energy from the battery of the electric vehicle 12 toward the current source, and more particularly toward the alternating current source 11.

According to one embodiment, the electric vehicle whose battery is charged using the charging device according to the invention is an electric vehicle with no onboard charger (i.e., device performing a conversion of alternating electric current into direct current capable of powering the battery).

According to one embodiment, the charging device 1 includes auxiliary power supply means. These power supply means can in particular be used to allow the exchanging of information and instructions with the current source and with the battery to be charged in a preliminary phase, making it possible to trigger the supply of current by the current source.

These auxiliary power supply means can comprise an auxiliary battery (or one or several electric battery cells) in the charging device 1 itself. Alternatively, it is possible to provide an auxiliary converter capable of being supplied with external current and converting it into direct current adapted for the operation of the charging device 1 in particular during the aforementioned preliminary phase.

It is in particular possible to provide for supplying this auxiliary converter with an alternating current from the electricity distribution grid. It is also possible to provide for powering it with an external battery, or with the onboard electric grid that powers the equipment of an electric vehicle (either the target vehicle that is charged, or if applicable the vehicle that is used as current source).

These auxiliary power supply means are particularly useful when neither of the two vehicles has an available power supply source at its charging connector. Indeed, for security reasons, direct access to dangerous voltages at the charging connectors of the vehicles is not authorized without the proven presence of an appropriate external connector, and without this connector being identified via secure control means by the vehicle and its supervision system as being an appropriate external charging connector.

This identification is done by exchanging signals between the vehicle and the external connector that is connected to it. It is therefore necessary to have a prior power source, to be capable of establishing the exchange of signals in order to trigger the connection of the electrical contacts making it possible on the one hand to have a current source coming from a vehicle, and on the other hand to power the charging of the other vehicle.

Figure 3:
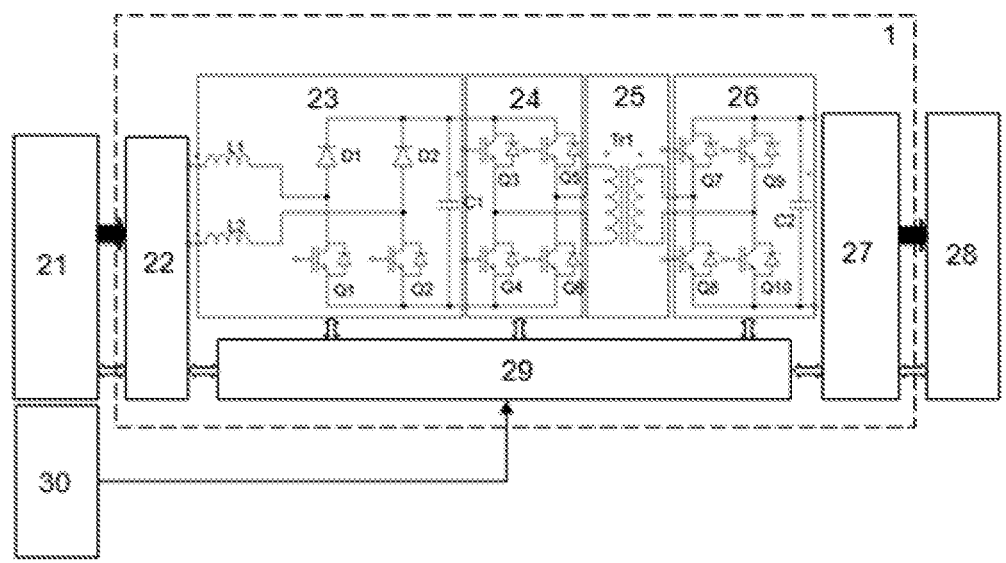
FIG. 3 is an example of a general electrical diagram of the electrical circuit of the charging device according to the invention.

In reference to FIG. 3, one possible electrical circuit for the charging device 1 according to the invention is described in more detail.

In this example, the charging device 1 comprises an input interface 22 that exchanges information and instructions with a current source 21 and can be supplied with electric current by this current source 21, or on the contrary (in redistribution mode) supply electric current to it.

In the first operating mode described above, the current source 21 is an electric vehicle battery. In the second operating mode described above, the current source 21 is an alternating current source. In the third operating mode described above, the current source 21 is another direct current source.

The charging device 1 also comprises an output interface 27 that exchanges information and instructions with an electric vehicle battery 28 and can supply the latter with direct electric current, or on the contrary (redistribution mode), receive direct electric current from it.

The charging device 1 further includes a first module 23, a second module 24 and a third module 26. A transformer 25 is provided between the second module 24 and the third module 26.

The first module 23 constitutes the first stage of the converter (performing the input current/intermediate current conversion) and the assembly formed by the second module 24, the transformer 25 and the third module 26 constitutes the second stage of the converter (performing the intermediate current/output current conversion).

The first module 23 is connected to the input interface 22. It comprises a set of inductances L1, L2, diodes D1, D2, switching elements Q1, Q2 and a capacitor C1. This first module 23 is capable of converting an alternating input current (from the current source 21) into a direct current with voltage U1 across the terminals of the capacitor C1 (intermediate current). This first module 23 also performs a power factor correction function. It is also capable of operating in DC-DC conversion when the current source 21 provides a direct input current.

The second module 24 is a bridge clipper, comprising switching elements Q3, Q4, Q5, Q6. It converts the direct current with voltage U1 into an alternating current supplying the transformer 25. It preferably has a resonant or quasi-resonant structure.

The transformer 25 provide the galvanic insulation, which is required by safety standards for any charging from the electricity distribution grid.

It forms an alternating current at the input of the third module 26, which is a rectifier, comprising switching elements Q7, Q8, Q9, Q10 and a capacitor C2. This rectifier supplies a direct current voltage U2 across the terminals of the capacitor C2 and thus to the output interface 27 (output current).

A control system 29 receives information and provides instructions to the input interface 22, the output interface 27 and the first module 23, second module 24 and third module 26.

This control system 29 is supplied with energy by auxiliary power supply means 30 as described above. The auxiliary power supply means 30 can be comprised in the charging device 1 or be outside the latter, as shown in the figure.

If the charging device 1 is not provided to be used according to the second operating mode, it is possible to use a simplified structure only performing a DC-DC conversion, and for example with no transformer 25, if galvanic insulation is not required for safety reasons.

Another possible (simplified) structure that may be used in place of the structure described above would include a single conversion module provided with a complex command.

The invention claimed is:

1. A charging device adapted for being connected to a battery of a first electric vehicle and to a battery of a second electric vehicle, the charging device for being supplied with direct input current by the battery of the first electric vehicle, and the charging device for supplying the battery of the second electric vehicle with a direct output current, the charging device comprising:
    a main converter adapted for receiving the direct input current and converting the received direct input current into the direct output current; and
    a control system adapted for adjusting parameters of a power supply of the battery of the second electric vehicle and capable of exchanging information and instructions with at least one of the first electric vehicle and the second electric vehicle, the control system being configured to trigger the supply of the direct input current by the battery of the first electric vehicle as part of a secure operation that includes identifying, by the first electric vehicle, an appropriate external connector connecting the battery of the first electric vehicle to the charging device, the control system being further configured to (i) exchange additional information and instructions with the first electric vehicle and (ii), in dependence upon the additional information and instructions exchanged with the first electric vehicle, avoid excessive depletion of the battery of the first electric vehicle to prevent immobilization of the first electric vehicle,
    wherein the control system includes an auxiliary converter adapted for receiving a direct current from an external battery and converting the received direct current into direct power supply current to power the control system while the main converter converts the received direct input current into the direct output current to supply the battery of the second electric vehicle with the direct output current.

2. The charging device according to claim 1, which is integrated into the first electric vehicle, or is integrated into the second electric vehicle.

3. The charging device according to claim 1, which is a removable and portable charging device.

4. The charging device according to claim 1, wherein the charging device is also adapted for being connected to an alternating current source and to a battery of an electric vehicle, the charging device for being supplied with an input current from the alternating current source, the charging device for converting the input current into a direct output current, and the charging device for supplying the battery of the electric vehicle with said direct output current.

5. The charging device according to claim 4, wherein the charging device comprises a first stage converting the input current into a direct intermediate current as well as a second stage converting the intermediate current into an output current.

6. The charging device according to claim 1, wherein the control system is adapted for adjusting parameters of the conversion of the input current and output current.

7. The charging device according to claim 1, wherein at least one of the first electric vehicle and the second electric vehicle is an electric automobile.

8. The charging device according to claim 1, wherein the auxiliary converter is adapted for receiving an external current from an onboard electric grid of the first electric vehicle or an onboard electric grid of the second electric vehicle, and converting it into a direct power supply current of the control system.

9. The charging device according to claim 4, wherein the control system is adapted for exchanging information and instructions with the alternating current source.

10. The charging device according to claim 1, wherein the main converter is adapted to receive a direct current input from the battery of the second electric vehicle and supply an alternating current to an alternating current source adapted to receive the alternating current from the charging device.

11. A method for charging an electric vehicle battery using a charging device, the method comprising:
    connecting the charging device to a battery of a first vehicle and a battery of a second vehicle;
    supplying a direct current from an external battery to a control system of the charging device;
    converting the direct current from the external battery in an auxiliary converter of the control system into direct power supply current to power the control system;
    supplying the charging device with a direct input current that is (i) different from the direct power supply current and (ii) from the battery of the first vehicle;
    converting the direct input current in a main converter of the charging device into a direct output current while the auxiliary converter of the control system converts the direct current from the external battery in the auxiliary converter of the control system into direct power supply current to power the control system;
    supplying the battery of the second vehicle with the direct output current from the charging device;
    adjusting parameters of a power supply of the battery of the second vehicle and exchanging information and instructions with at least one of the first vehicle and the second vehicle via the control system, wherein the supply of the direct input current by the battery of the first vehicle is triggered as part of a secure operation that includes identifying, by the first vehicle, an appropriate external connector connecting the battery of the first vehicle to the charging device;
    exchanging additional information and instructions with the first vehicle; and
    in dependence upon the additional information and instructions exchanged with the first vehicle, avoiding excessive depletion of the battery of the first vehicle to prevent immobilization of the first vehicle.

12. The method according to claim 11, wherein: the charging device is integrated into the first vehicle, and the connecting of the charging device comprises connecting the charging device to the second vehicle; or the charging device is integrated into the second vehicle, and the connecting of the charging device comprises connecting the charging device to the first vehicle.

13. The method according to claim 11, wherein the charging device is a removable device, and the connecting of the charging device comprises connecting the charging device to the first vehicle and the second vehicle.

14. The method according to claim 11, wherein the direct output current has at least one of a voltage of 200 to 550 V and a power less than or equal to 20 kW.

15. The method according to claim 11, comprising adjusting parameters for the supply of power to the battery of the second vehicle and the exchange of information and instructions between the charging device and at least one of the first vehicle and the second vehicle.

16. The method according to claim 11, wherein at least one of the first vehicle and the second vehicle is an electric automobile.

17. The method according to claim 11, wherein the auxiliary converter is an onboard electric grid of the first vehicle or an onboard electric grid of the second vehicle.

18. The method according to claim 11, further comprising:
sending an instruction from the charging device to the first vehicle to trigger the supply of power to the charging device from the battery of the first vehicle.

19. The method according to claim 11, further comprising:
the main converter receiving a direct current input from the battery of the second vehicle and supplying an alternating current to an alternating current source adapted to receive the alternating current from the charging device.

* * * * *